June 13, 1950     C. S. ASH     2,511,144
DUAL WHEEL

Filed Aug. 2, 1945     3 Sheets-Sheet 1

INVENTOR
Charles S. Ash.
BY
ATTORNEY

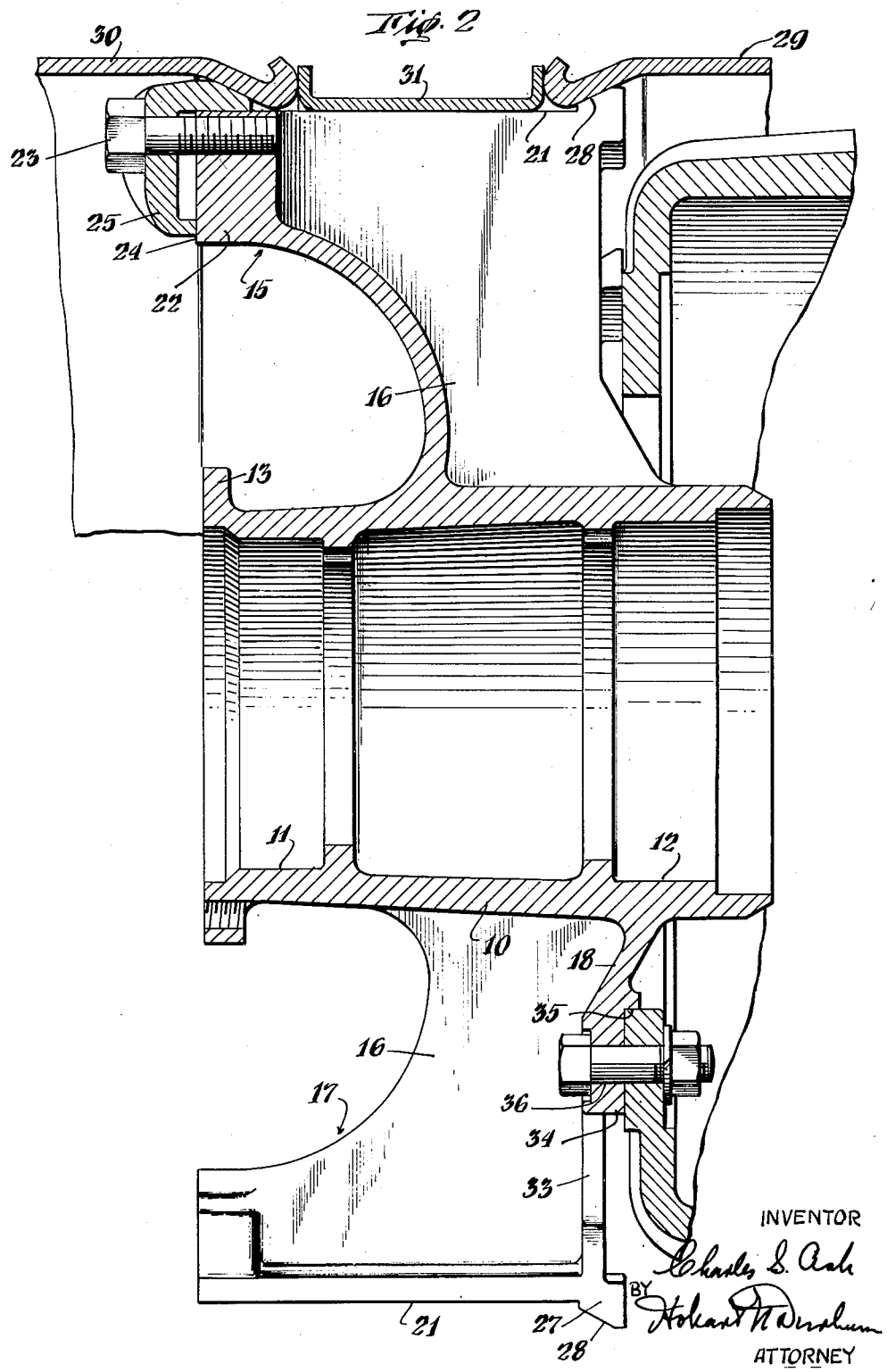

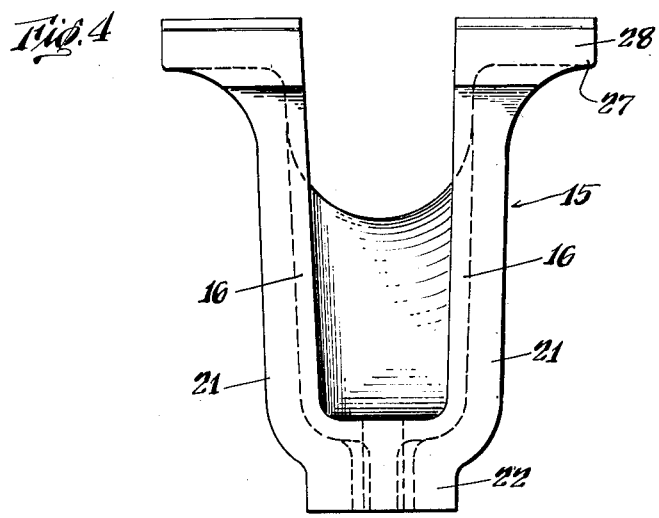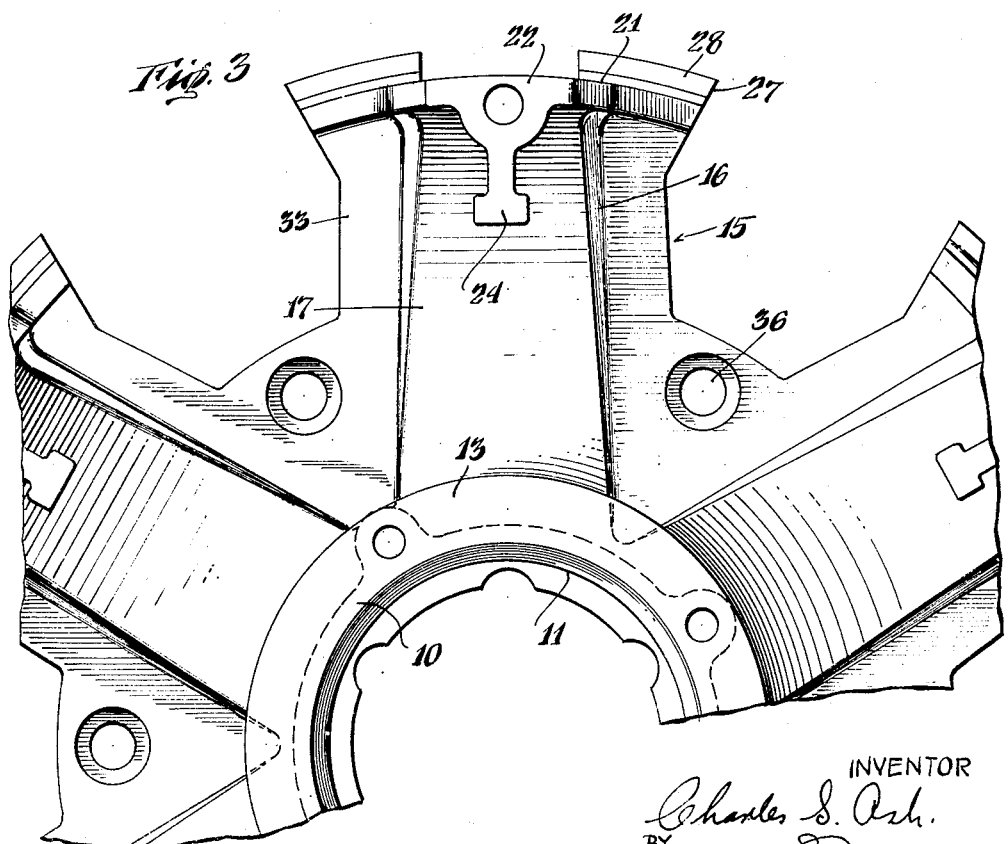

Patented June 13, 1950

2,511,144

UNITED STATES PATENT OFFICE 2,511,144

DUAL WHEEL

Charles S. Ash, Milford, Mich.

Application August 2, 1945, Serial No. 608,486

1 Claim. (Cl. 301—66)

The present invention relates to vehicle wheels and more particularly to a heavy duty type of vehicle wheel for carrying a plurality of road engaging elements.

Objects and advantages of the invention will be set forth in part hereinafter and in part will be obvious herefrom, or may be learned by practice with the invention, the same being realized and attained by means of the instrumentalities and combinations pointed out in the appended claim.

The invention consists in the novel parts, constructions, arrangements, combinations, and improvements herein shown and described.

The accompanying drawings, referred to herein and constituting a part hereof, illustrate one embodiment of the invention, and together with the description, serve to explain the principles of the invention.

Of the drawings:

Fig. 2 is a cross-sectional view taken along line 2—2 of Fig. 1;

Fig. 3 is a fragmentary side elevational view of the wheel, shown in the two preceding figures taken from the outer or front side looking inwardly; and Fig. 4 is an elevational view of a spoke end of the wheel shown in the preceding figures.

Figure 1:
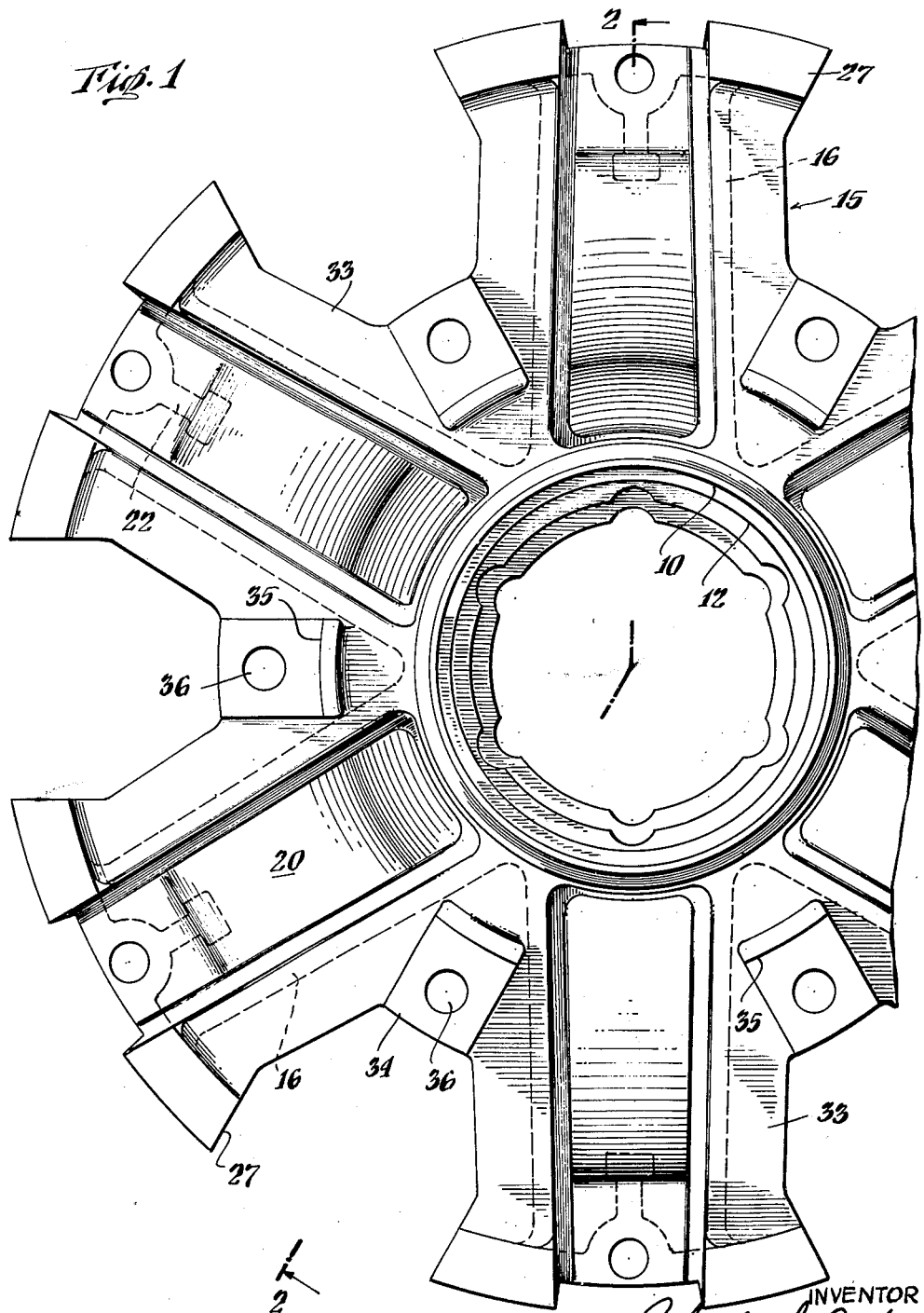
Fig. 1 is a side elevational view of a vehicle wheel embodying the present invention taken at the inner or back side of the wheel looking outwardly.

The present invention has for an object the provision of a strong and light weight vehicle wheel of a type adapted for heavy duty uses as, for instance, on trucks, busses, trailers and the like. The wheel of the present invention will be found to be of relatively simple design and construction and thus economical to fabricate. Another object of the invention is the provision of an improved vehicle wheel adapted to demountably mount dual rims.

Referring now in detail to the illustrative embodiment of the invention shown by way of example in the accompanying drawings, the vehicle wheel of the present invention is a single integral member preferably of cast metal adapted to demountably mount a pair of side by side pneumatic tire rims. As best shown in Fig. 2 of the drawings, the casting is formed with an elongated substantially cylindrical hub portion 10 having internal finished bearing seats 11 and 12 to receive suitable roller bearings whereby the wheel may be mounted for free rotation on a vehicle axle end (not shown). The hub portion may be formed with a flange 13 at its outer end to which a suitable hub cap may be secured.

Equally circumferentially spaced about the hub portion 10, the wheel is formed in a plurality of outwardly radially extending spokes indicated generally by the numeral 15, each spoke being hollow and open in back, or toward the inner side of the wheel, for greater ease in casting the integral structure. As shown, each spoke comprises a pair of side webs 16 joined to the hub 10 at their bases and extending outwardly therefrom. As best shown in Fig. 1, the side webs 16 of each spoke extend outwardly substantially parallel to each other and to a radius of the wheel equidistant between them. If desired, and as shown in the drawings, the webs may converge slightly on each other as they progress outwardly.

At their bases where they join with hub portion 10 the side webs 16 extend from front edges 17 substantially centrally of the length of the hub to back edges 18 adjacent the inner end of the hub. Radially outwardly, the front edges 17 curve axially outwardly to overhang the outer end of the hub 10 and terminate substantially at the end of the hub. The front walls of the spokes 16 comprise curved webs 20 which are joined at their inner edges to hub 10 and along their curved lengths to the front edges 17 of the side webs of their respective spokes.

At the top of each side web 16 of spokes 15 there is provided a flat edge or web 21 which extends from the rear to the front of the spoke ends. The edges 21 extend outwardly over their respective webs 16 and provide upper surfaces upon which to mount tire rims. At the front of the spokes 15 the flat edges 21 of each spoke converge and join, as may be seen in Fig. 4 of the drawings. Immediately beneath the converging place of the edges 21, the front web 20 of each spoke is thickened, as indicated at 22, and a threaded aperture is provided therethrough to receive a lug bolt 23. Each front web 20 is also provided with an axial extension 24 which joins the thickened portion 22 immediately above it, and the extensions 24 serve as seats for lugs 25 on lug bolts 23, providing means for holding the dual rims in place on the wheel.

At the rear edge of the outer ends of spokes 15 they are formed with circumferentially extending edges or webs 27 each of which merges with a respective flat edge or web 21. The spoke end rear edges 27 are thickened and inclined to provide inclined seats 28 against which may seat the edge bead of a tire rim 29 of a conventional type. Another tire rim 30, which is preferably a duplicate of rim 29 but oppositely disposed, is mounted on the outer ends of spokes 15 on the surfaces provided by edges 21, and a spacer ring 31 is positioned between the rims. The rims 29 and 30 are thus securely held in assembled relation on the wheel by means of lugs 25 and may be demounted when desired.

The spoke and rear edges 27 are supported and strengthened by webs 33 which extend radially inwardly from said edges and are formed integrally with respective back edges 18 of the spoke side webs 16. The webs 33 extend radially inwardly to and merge with hub portion 10, being somewhat inwardly turned at their inner ends where they merge with the hub, as shown in Fig. 2. At places substantially radially outwardly of hub 10 the webs 33 of adjacent spokes 15 extend toward each other and join as indicated at 34 providing a web connection between the spokes. The connections 34 may be provided with seats 35 to receive a flange of a brake of any suitable and conventional type. Such a brake drum may be secured to the wheel by bolts received through apertures 36 provided in connections 34.

From the foregoing description it will be apparent that there is provided a heavy duty type of vehicle wheel adapted to carry dual tire rims. The wheel is of light, spoked, construction but entirely sturdy and safe, and is simply and strongly formed of a single casting. The spokes are so formed that no core work is necessary in the casting of the wheel.

The invention in its broader aspects is not limited to the specific mechanism shown and described but departures may be made therefrom within the scope of the accompanying claim without departing from the principles of the invention and without sacrificing its chief advantages.

What I claim is:

A vehicle wheel comprising, in combination, a cast hub and a plurality of spokes cast integrally with said hub, each said spoke comprising a hollow body having a pair of spaced side webs and a front web joining said side webs, an axially and circumferentially extending edge web along the upper edge of each said side web, said edge webs converging and joining at the outboard side of said spokes and having a radially outer, circumferentially extending surface at said convergence to seat a rim lug for an outboard rim, a thickened portion integral with said front web at the radially outer end thereof adjacent said convergence of said edge webs apertured to receive a lug bolt, said edge webs terminating at the inboard side of said wheel in thickened, inclined, circumferentially extending portions providing seats for an inboard rim, said edge webs, inclined portions thereof, and said side webs being spaced from each other providing spoke bodies open and entirely disconnected at the tops and inboard sides thereof from said hub to and through the periphery of the wheel.

CHARLES S. ASH.

REFERENCES CITED

The following references are of record in the file of this patent:

UNITED STATES PATENTS

| Number | Name | Date |
|---|---|---|
| 1,860,001 | Vanderveer | May 24, 1932 |
| 1,887,378 | Nelson | Nov. 8, 1932 |
| 1,893,947 | Keller | Jan. 10, 1933 |
| 2,041,996 | Eksergian | May 26, 1936 |
| 2,164,772 | Keller | July 4, 1939 |
| 2,242,986 | Zipper | May 20, 1941 |

FOREIGN PATENTS

| Number | Country | Date |
|---|---|---|
| 5,398 | Great Britain | 1913 |